United States Patent [19]

Holland

[11] Patent Number: 4,584,054
[45] Date of Patent: Apr. 22, 1986

[54] SOLIDS REFINING PROCESS

[75] Inventor: Lawrence R. Holland, Huntsville, Ala.

[73] Assignee: Research Corporation, New York, N.Y.

[21] Appl. No.: 630,503

[22] Filed: Jul. 13, 1984

[51] Int. Cl.⁴ .............................................. C30B 23/00
[52] U.S. Cl. ........................... 156/609; 156/DIG. 72; 156/DIG. 82; 156/DIG. 92; 156/DIG. 105; 252/62.3 ZT
[58] Field of Search ....... 156/609, DIG. 61, DIG. 71, 156/DIG. 72, DIG. 78, DIG. 82, DIG. 92, DIG. 105; 423/508, 509; 252/62.3 ZT

[56] References Cited

U.S. PATENT DOCUMENTS 3,551,117 12/1970 Yamanaka et al. ......... 252/62.3 ZT
4,141,777 2/1979 Matveev et al. .................... 156/609

FOREIGN PATENT DOCUMENTS 153707 1/1982 Fed. Rep. of Germany ...... 156/609
2276872 3/1976 France ......................... 156/DIG. 82
450579 12/1974 U.S.S.R. ............................... 156/609

OTHER PUBLICATIONS

Holder for Fragile Parts, NASA Tech. Briefs, Summer 1983, p. 453.
Holland, L., A Thermal Transmission Function for Fused Silica Ampoules, Journal of Crystal Growth, 49 (1980), pp. 426–430.
Kingery, W. et al, Introduction to Ceramics, 2nd Edition, 1976, pp. 612–614, 624–628.
R. S. Wagner and W. C. Ellis, The Vapor-Liquid-Solid Mechanism of Crystal Growth and Its Application to Silicon, Transactions of the Metallurgical Society of AIME, vol. 233, Jun. 1965, pp. 1053–1064.
S. Ibuki, On the Crystal Growth of Cadmium Sulphide, Journal of the Physical Society of Japan, vol. 14, No. 9, Sep. 1959, pp. 1181–1195.

Primary Examiner—David L. Lacey
Attorney, Agent, or Firm—Scully, Scott, Murphy and Presser

[57] ABSTRACT

A process and an apparatus provide a purified material by employing a rate of condensation of the material which is substantially greater than the rate of solidification of the material. Tellurium and cadmium are effectively purified by the process.

13 Claims, 5 Drawing Figures

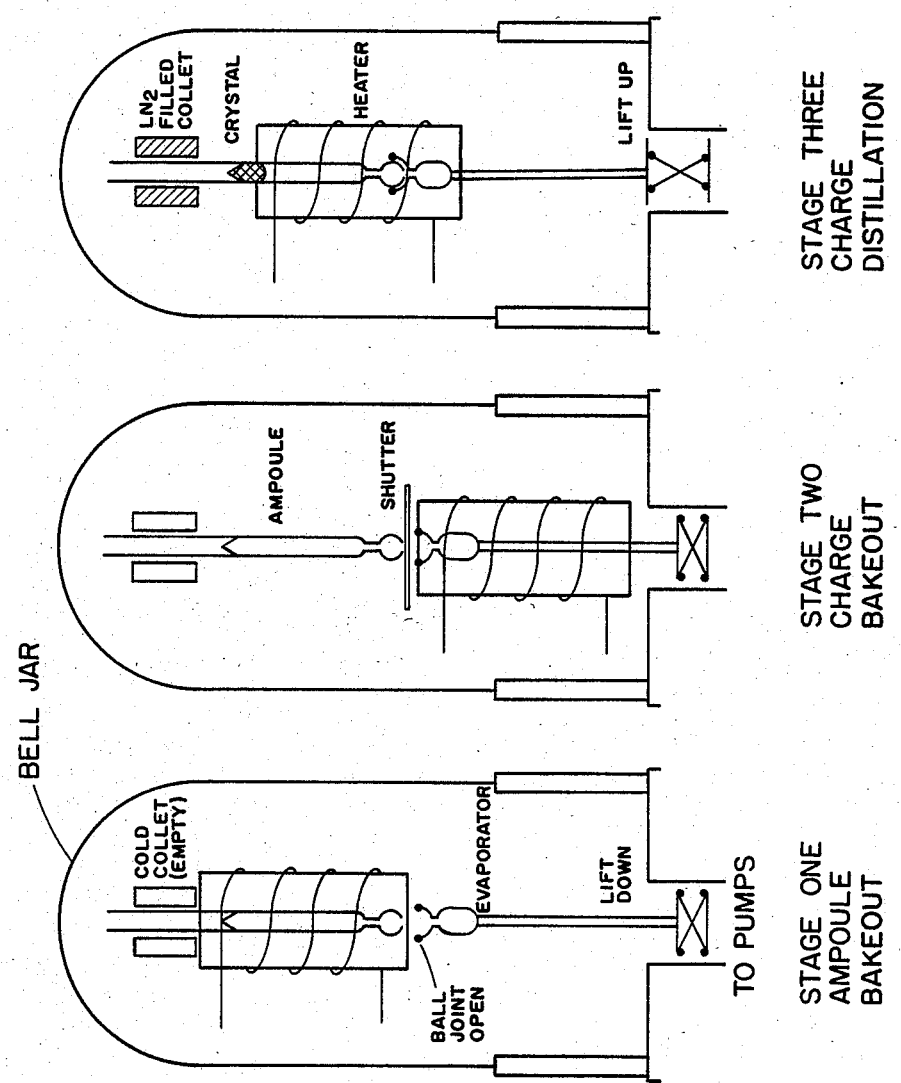

SOLIDS REFINING PROCESS

The invention described herein was made in the course of work supported by the Materials Processing in Space Program of the National Aeronautics and Space Administration.

BACKGROUND OF THE INVENTION

1. Field of the Invention

This invention relates to the field of highly purified solids. This invention more particularly relates to a vapor-liquid-solid (VLS) process and apparatus for preparing highly purified solids, such as tellurium and cadmium. This invention especially relates to an improved process and apparatus for preparing highly purified solids of tellurium or cadmium by the combined effect of distillation and normal freezing wherein the rate of condensation is substantially greater than the rate of crystallization so that the excess liquid continually washes the growing solid removing the impurities rejected by solidification.

2. Description of the Prior Art

Vacuum distillation of metals is a well known process. See (Ultrapurification of Semiconductor Materials, Proc. Conf. on Ultrapurification of Semicond. Mat., Boston, Mass., April 1961, M.S. Brooks and J.K. Kennedy, Eds. (MacMillan, New York 1962); Harman et al., *J. Phys. Chem. Solids*, 2 181 (1957)). The use of vapor transport to move material into a process tube is also known (Lawson et al., 9 *J. Phys. Chem. Solids*, 325 (1959); Dziuba, 26 *Acta Phys. Polonica*, 897 (1964)). Faktor and Garrett in "Growth of Crystals from the Vapour", (Chapman and Hall, London 1974) discussed the effect of small amounts of inert gas on vapor transport. Russell and Woods (46 *J. Crys. Growth* 323 (1979)) demonstrated that extraneous gas evolving from a sealed system is difficult to control and requires clever manipulation for detection and measurement. Some investigators who experienced low vapor flux in a VLS system assumed that the solid growth was limited by the processes occurring at the liquid-solid interface. (Andryushenko et al., 15 *Izv. Akad. Nauk SSSR, Neorq. Mater* 1573 (1979).)

It is an object of this invention to prepare highly purified solids.

It is another object of this invention to improve VLS systems for preparing purified solids.

It is a further object of this invention to prepare highly purified tellurium and cadmium in an improved VLS system.

The achievement of these and other objects will be apparent from the following description of the subject invention.

SUMMARY OF THE INVENTION

Briefly, the objects of this invention are achieved by combining segregation by solidification with distillation producing a material with an impurity distribution similar to that of normal freezing. In this liquid-vapor-solid process vapor condenses into a liquid drop substantially faster than material in the drop solidifies and the excess liquid is returned to the source.

In this invention, an improved vapor-liquid, solid (VLS) solids refining process is provided which comprises:

(a) establishing and maintaining in a closed VLS system having an evaporation zone and an condensing-solidifying zone an ambient gas pressure which is substantially below the vapor pressure at its melting point of a material located in the evaporation zone, said material being the material to be purified, (b) evaporating the material in the evaporation zone to provide vapors of the material, said material having a vapor pressure in the evaporation zone greater than the vapor pressure of said material at its melting point, (c) maintaining a temperature in the condensing-solidifying zone effective to condense the vapors of said material to a liquid and to solidify said material at a rate substantially less than the rate of condensation of said material, whereby the liquid material continuously washes the surface of the solid material in the condensing-solidifying zone, and (d) transporting the unsolidified portion of the liquid material from condensing-solidifying zone to the evaporation zone.

In addition, this invention concerns an apparatus in which the above process may be practiced. This apparatus comprises (a) an evaporator having enclosed sides, an enclosed lower end and an open upper end provided with a ball joint, (b) a process tube having enclosed sides, an enclosed upper end and an open lower end provided with a ball joint, the ball joint of said evaporator mating with the ball joint of said process tube to provide communication between the interior portions of said evaporator and said process tube, (c) heating means effective to evaporate material located in the interior of the lower end of the evaporator, (d) cooling means effective to condense and solidify vaporous material located in the interior of the upper end of the process tube, (e) positioning means effective to position said heating means relative to the longitudinal axis of the evaporator, and (f) vacuum means effective to evacuate the interior portions of the evaporator and the process tube and to maintain a sub-atmospheric pressure outside of the mated evaporator and process tube which is lower than the pressure in the interior of the mated evaporator and process tube.

BRIEF DESCRIPTION OF THE DRAWINGS

FIGS. 3A, 3B and 3C are a schematic presentation of several of the stages which may be employed in the subject process.

DESCRIPTION OF THE PREFERRED EMBODIMENT

Figure 1:
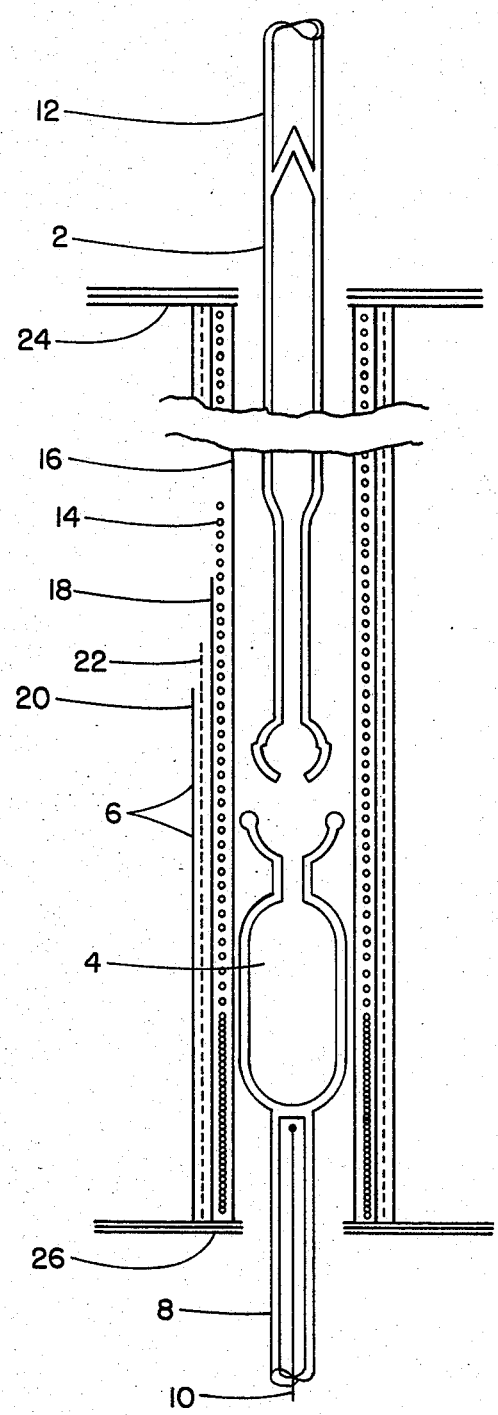
FIG. 1 is a drawing of an apparatus in which the process of the invention may be practiced.

The present invention relates to improvements in providing materials in purified form. Briefly, the material to be purified is evaporated in a closed system which has been previously evacuated to high vacuum. The vapors from the material pass to a cold area of the system where the material is condensed and then solidified at a rate substantially less than the rate of condensation. In this fashion a pendulus liquid drop forms on the solid material. The drop grows until it falls from the solid material thereby continually washing the surface of the solid removing any impurities that may be accumulating on the surface.

This invention may be utilized with a wide variety of materials to provide these materials in highly purified form. The materials which may be employed in this invention must have particular properties which makes them susceptible to the purification procedures employed. The material must have a vapor pressure under the evaporation conditions in the system which is greater that the vapor pressure of the material at its melting point. In general, the vapor pressure under the vaporization conditions should be 10 to about 300 times, preferably about 50 to about 100 times the vapor pressure of the material at its melting point. Examples of useful materials include members of Groups II B and VI A (except oxygen) of the Periodic Table, the rare earths, the alkali metals, the alkaline earth metals and compounds which evaporate congruently, such as CdS. Although vitreous silica has proven to be a useful material of construction for the apparatus of this invention, some of the materials to be purified, as for example, the alkali metals, require the use of a material of construction other than vitreous silica which would not be subject to attack by the material being purified. In a particularly preferred embodiment, tellurium and cadmium can be purified by the process of and in the apparatus of this invention. These are the materials which are the subject of the following detailed discussions.

The key element of this invention and the aspect of it which leads to the high degree of purification obtained is the use of a level of heat removal which causes the material to be solidified at a rate which is substantially less than the rate of condensation of said material. In general, the solidification rate should be about 0.5 to about 10%, preferably about 1 to about 5%, of the condensation rate. Thus, as the solid material is formed, a pendulus drop forms thereon. Periodically a drop of this liquid falls from the solid back into the evaporation zone. This continuous washing of the solid surface removes any impurities rejected during the solidification providing a highly purified product.

In a preferred embodiment of this invention, tellurium and cadmium are subjected to the purification process. This VLS process and apparatus assures purified, largely single crystal Te and Cd loaded into a silica ampoule ready for synthesis and growth of CdTe or (Hg-Cd)Te. The system also provides vacuum prebakeout of the silica.

The source material, Te or Cd, is in an evaporator, vertically below and connected to the ampoule by a ground silica ball joint. The evaporator temperature maintains a vapor pressure of 10 torr (490° C. for Cd, 630° C. for Te), while a heat extractor cools the growing crystal at the top of the ampoule. Highly non-equilibrium condensation of the vapor transports about 10 mg/s into a pendulus liquid drop on the crystal face (321° C. for Cd, 450° C. for Te). The heater moves downward so that the crystal grows at about 100 µg/s, 1% of the liquid accumulation rate. The excess liquid causes the drop to grow until part of it falls back to the evaporator, about twice each minute. This dropping completely mixes the liquid at the growth face, and also the source material. The growing crystal is thus continually washed by freshly distilled liquid so that impurities rejected by solidification do not accumulate there. The impurity profile in the finished crystal is the ultimate distribution profile for multiple zone passes, except that the effective segregation coefficient is the product of those for solidification and vaporization.

The entire process may be described as a five step process Step 1 —The ampoule is baked at 120° C. and $10^{-8}$ torr to remove surface moisture. Step 2 —The heater is lowered over the evaporator, a shutter interposed in the open ball joint, and the Te charge outgassed at a vapor pressure of $10^{-3}$ torr (329° C.). Step 3 —The shutter is removed, the joint closed (without any grease, as leakage is outward) and the Te distilled into the ampoule. Step 4 —The evaporator is exchanged for one containing Cd, which is also baked at $10^{-3}$ torr (219° C.) with the shutter in place. Step 5 —The Cd is distilled into the ampoule on top of the Te, which remains cool and solid.

The entire process is done in a vacuum bell jar with the pressure maintained at or below $10^{-8}$ torr by an oil diffusion pump and $LN_2$ cooled chevron trap. At the end the bell jar is back filled with dry nitrogen so that the ampoule can be transferred to the sealing station without admitting oxygen or moisture.

The following is an example of an embodiment of the present invention.

Apparatus

As constructed, the heart of the system comprised process tube 2 and evaporator 4 connected by a ground ball joint 6, all made of vitreous silica, as shown in FIG. 1. Ball joint 6 was size 18/9 from Heraeus-Amersil, ground and polished by hand first with 1.0 micron and then 0.3 micron polishing alumina suspended in distilled water. The demountable joint was originally used so that process tube 2 could be weighed to determine accurately the mass of the charge loaded into it. No grease was used on the joint as it had to work at high temperature, and therefore the entire assembly was placed in a high vacuum bell jar so that leakage would be outward only. In fact, a few minutes polishing the ball joint gave specular surfaces which gave no significant leakage even of hydrogen over periods of weeks, as might be foreseen from the Poiseuille equation which states that the leakage is proportional to the product of the square of the passage cross section and the square of the pressure. Evaporator stem 8 housed thermocouple 10 for monitoring the melt temperature, and was mounted in a manually actuated lift system (not shown) which raised the evaporator to close the ball joint. The linkage allowed a maximum lift of 50 mm, and contained a spring which assured positive closure pressure in spite of differential thermal expansion between the metallic frame of the system and the vitreous silica parts.

Figure 2:
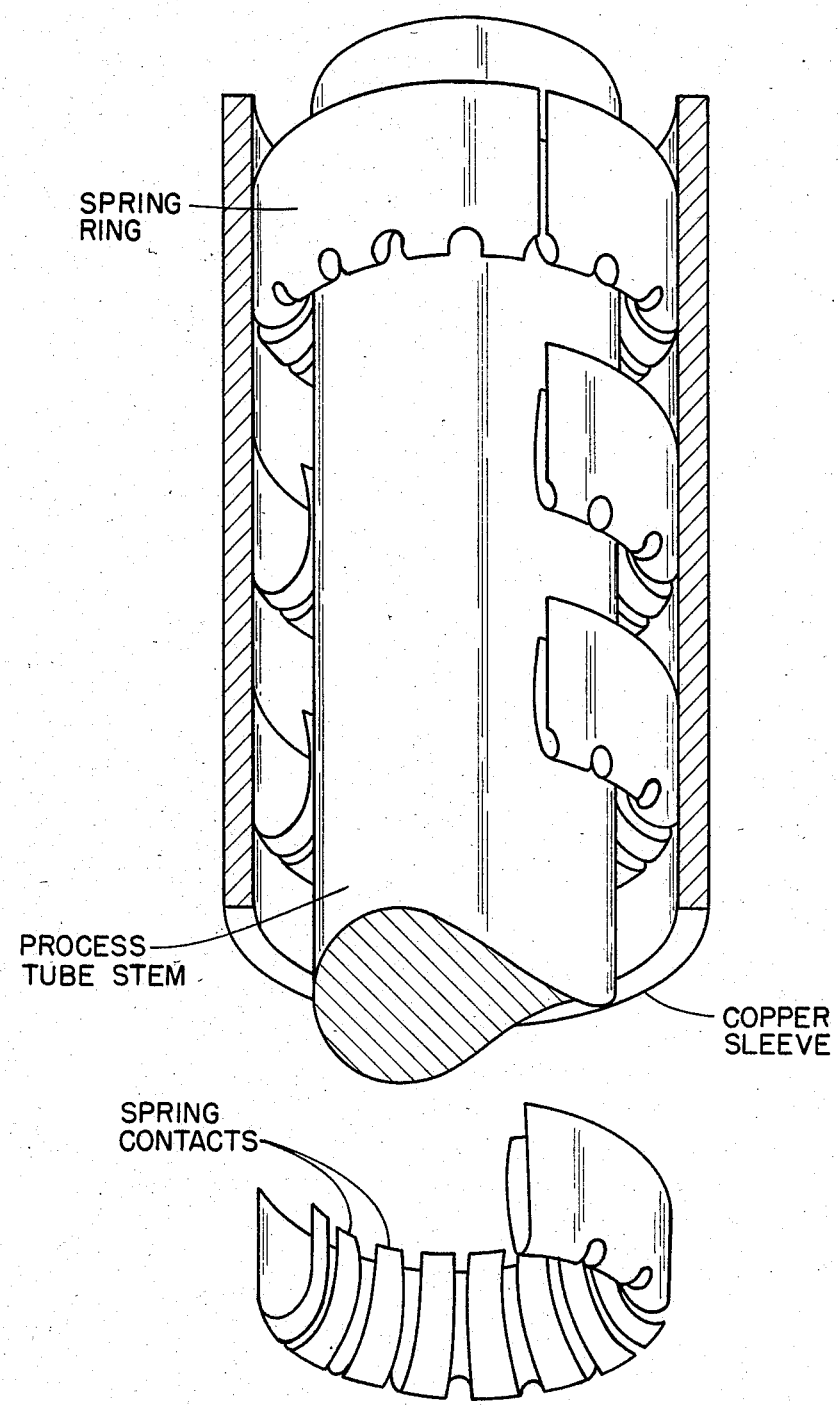
FIG. 2 is a drawing of a spring collet which may be employed in the apparatus of FIG. 1.

Process tube stem 12 was gripped by a spring collet as shown in FIG. 2, which in turn was mounted in a through hole in a copper tank filled with liquid nitrogen. The assembly was designed to extract the heats of condensation and solidification of the distillate by thermal conduction through the multiple berillium copper spring contacts of the collet. As shown in FIG. 2, the spring collet or spring ring consists of a set of fingers or spring contacts which grip the process tube stem. Each individual spring contact applies a force and the multiplicity of spring contacts in the collet maintain a firm grip on the process tube stem.

Heater 14 was a platinum—30% rhodium wire wound on a 30 mm i.d. vitreous silica tube 16 which was provided with bumps to keep the winding properly spaced. The overall length of the winding was 356 mm, and the lowest 50 mm were wound at double density so as to provide a slight temperature gradient. There were two concentric silica tubes 18 and 20 around the heater, and between them was reflector 22 made of stainless steel foil, slotted from end to end on opposite sides to provide windows for illuminating and observing the interior. Each end was covered by a triple layer of stainless steel plate 24 and 26, which served as support and insulation. The end plates had 25 mm diameter holes for passage of evaporator 4 and process tube 2, and the hole in upper plate 24 could be closed by a manually operated stainless steel shutter (not shown). To attain a temperature of 630° C. required about 250 watts.

The entire heater assembly could be raised or lowered by a set of three recirculating ball lead screws chained together and driven by a stepping motor which could be programmed to provide a fast transverse or crystal growth speed down to $3.33 \times 10^{-4}$ mm/sec.

The vacuum system, as shown in FIGS. 3A, 3B and 3C, was a bell jar with a feedthrough collar on a baseplate, pumped by a diffusion pump using DC-705 fluid and a liquid nitrogen cooled chevron trap. The cold collet support for the process tube at the top of the chamber and the associated plumbing constituted a very effective Meissner cryocoil, which when charged with liquid nitrogen permitted reaching a pressure of $5 \times 10^{-9}$ torr. The heater movement, evaporator lift, and shutter action were all operated through Ferrofluidic rotary seals. Two ion gages and a quadrupole residual gas analyzer were used for monitoring the vacuum. Type E thermocouples were used to monitor the temperatures at the evaporator and the cold collet.

Operation

FIGS. 3A (Stage One), 3B (Stage Two) and 3C (Stage Three) show schematically the three stages associated with preparing a process tube and loading the first element, which was tellurium. Prior to closing and evacuating the bell jar, the raw tellurium was loaded into the evaporator and the process tube was secured in the collet.

In the first stage (FIG. 3A) the system was evacuated, the heater was moved to its upper limit, and the evaporator lift was lowered to open the ball joint. The evaporator was clear of the bottom of the heater and was not greatly heated by it. With the collet cooled only by radiation and about 200 watts applied to the heater, the process tube was baked over 550° C. The collet temperature stayed at 100° C., which was not enough to degrade the berillium copper grip springs. Since the only cryogetter was the chevron trap in the pump, the vacuum was limited to $10^{-7}$ torr, but these conditions were adequate to clean up the system and remove the surface water from the vitreous silica process tube in one day.

In the second stage (FIG. 3B) the heater was moved to its lowest position and the shutter was closed across the top, between the halves of the open ball joint. The tellurium charge was roasted at 329° C., where the vapor pressure was $10^{-3}$ torr. At this temperature, the loss of tellurium was negligible but surface oxygen was driven off and other volatile contaminants including water were removed. Since the chamber pressure was low enough for molecular flow conditions to hold, the closed shutter adequately protected the inside of the process tube simply by blocking the line of sight path. After an hour, the tellurium charge was effectively outgassed.

Distillation of the tellurium took place in the third stage (FIG. 3C). The ball joint was closed and the heater moved nearly to the top of its range so that the evaporator was just inside the lowest part. With 250 watts the temperature was brought to 630° C., and the cold collet was fed with liquid nitrogen. As the heater was stepped slowly downward, the tip of the process tube emerged from the top of the heater. When the temperature of the tip dropped to 499° C., liquid which had condensed there began to crystallize. The point of solidification remained nearly fixed with respect to the heater, and as the heater moved slowly downward, the crystal grew from the hanging drop, inverted Bridgman style. The vapor pressure at the source was 10 torr, while that of the drop at the melting temperature was only 0.16 torr, and so a vapor transport was established. The downward speed of the heater was adjusted so the rate of crystallization was a small fraction of the rate of condensation, with the result that the drop grew until the surface tension could no longer support it, whereupon the major part fell back into the evaporator. This was repeated periodically, stirring the melts. The first solid stuck firmly to the tip of the process tube, but beyond about 5 mm growth proceeded in a fashion separated from the tube wall. When sufficient tellurium had been crystallized, the system was shut down, the ball joint opened, and the bell jar back filled with dry nitrogen.

The evaporator was then cleaned and reloaded with cadmium which was to be transferred to the process tube containing tellurium. The second stage process was repeated with temperature at 219° c. giving a cadmium vapor pressure of $10^{-3}$ torr. Then the third stage was repeated with the evaporator at 490° C. (10 torr). Cadmium freezes at 321° C., at which temperature the vapor pressure of tellurium is less than $10^{-3}$ torr, and so it was possible to start growing a cadmium crystal directly on the tellurium. At first the tellurium surface blackened, apparently by the formation of a thin layer of passive cadmium telluride. Cadmium crystal growth was started at the same location in the heater where tellurium growth terminated. Since the heater had to be moved for the repeat of the second stage, the number of steps applied to the motor was counted so that an exact reversal could be programmed to return the heater to its former position.

It was observed that when commercial zone refined tellurium was first melted, a large and variable quantity of dissolved hydrogen was released. Trapped in the process tube, this hydrogen had a profound effect on the transport of matter and heat, and also on the form of the grown crystal. Specifically, the presence of a gas, such as hydrogen, significantly reduces the quantity of material transported from the evaporator to the process tube. It was found that this hydrogen could be removed if the charge in the evaporator was resolidified and cooled below 329° C. At this temperature the ball joint was opened to dump the gas into the bell jar for analysis and removal without loss of tellurium. If this were not done, the hydrogen could remain in the process tube for weeks. Alternately, any uncondensable gases released during the evaporation and which will adversely influence the rate of transfer of vapors from the evaporator to the process tube could be vented by providing a small vent tube in the process tube. This vent tube would carry the vented gas, together with a small portion of tellurium to a cold trap where the tellurium would be removed from the vacuum system.

Transport

Faktor and Garrett treated the effect of small amounts of inert gas on vapor transport and presented equations from which the reduction in the vapor transport in crystal growth system could be calculated.

The hydrogen found in the present VLS system was probably dissolved in the tellurium bars when they were zone refined, as that process uses a hydrogen atmosphere. To evaluate the effect of hydrogen in the process of the present invention, consider first the case in which all of the inert gas has been vented and the process tube is pumped $10^{-8}$ torr or less. The evaporator, or source is maintained at 10 torr, while the sink is maintained close to the melting temperature, where the vapor pressure is 0.16 torr for tellurium and 0.10 torr for cadmium. The Poiseuille equation for viscous flow is $$F = \frac{M\pi a^4}{16RT\eta l}(P_1^2 - P_2^2) \simeq \frac{M\pi a^4}{16RT\eta l} P_1^2,$$

where F is mass flow rate, M is the molecular weight, a is the tube radius, l its length, R the gas constant, $P_1$ is the source pressure, and $P_2$ the sink pressure, here taken as negligible. The viscosity, $\eta$, is estimated from the Sutherland equation for mercury and the fact that it is proportional to the square root of the molecular weight.

$\eta(Cd, 763K) = 6 \times 10^{-5}$ Pa s $\eta(Te, 903K) = 10 \times 10^{-5}$ Pa s.

The 10 torr source pressure is 1333 Pa, and effective values for a and l are 2.5 mm and 100 mm respectively in a typical arrangement. Thus F (Cd, 763K) = $40 \times 10^{-3}$ g/s F (Te$_2$, 903K) = $46 \times 10^{-3}$ g/s.

The model assumes that the pressure increases as the square root of the distance from the sink to the source, and that the temperature is nearly constant at the source value until very close to the sink, where the sudden drop in temperature and pressure make the condensation a nonequilibrium process. Qualitative verification of these conditions is possible: a sharp reduction of heater power caused condensation on the walls of the process tube, uniform except for a very narrow band near the vapor sink.

If an inert gas is present, then the diffusion model of Stefan as presented by Faktor and Garrett is used. An inert gas pressure very much lower than the source vapor pressure has a strong effect of the transport, as the inert gas is swept by the vapor toward the sink, where it is compressed and can escape only by upstream diffusion. The total pressure is the same at all points in the system, and the inert gas dominates at the sink. For tellurium, the mass flow, F', is $$F' = \frac{\pi a^2 MDP}{RTl} \ln\left(\frac{P - p(Te_2, \text{sink})}{P - p(Te_2, \text{source})}\right),$$

where D is the interdiffusion constant, P is the total pressure, constant and nearly equal to the source vapor pressure, and p is the partial pressure of the component indicated at the place indicated. Since P >> p (Te$_2$, sink), and P−p (Te$_2$, source)=p (H$_2$, source), we can approximate $$F' = \frac{\pi a^2 MDP}{RTl} \ln\left(\frac{p(Te_2, \text{source})}{p(H_2, \text{source})}\right).$$

For tellurium diffusing in hydrogen at 10 torr and 903K the diffusion constant is approximately $4 \times 10^{-2}$ m$^2$/s. Assuming the same tube dimensions as above and P=p (Te$_2$, source) at 903K, this gives F'[p (H$_2$, source)=1 torr]=$0.8 \times 10^{-3}$ g/s F'[p (H$_2$, source)=$10^{-1}$ torr]=$1.6 \times 10^{-3}$ g/s F'[p (H$_2$, source)=$10^{-2}$ torr]=$2.4 \times 10^{-3}$ g/s.

F' is orders of magnitude lower than F.

The heat of condensation is the product of the vaporization enthalphy and the vapor mass flow. The vaporization enthalphy for tellurium is 1.28 j/g and that for cadmium is 1.00 j/g, and so the heat transported by the vapor is from 1 to 50 mW for flow from diffusion controlled to the viscous limit.

The solidification heat depends on the crystal growth rate and diameter. A typical process tube has an 8 mm inside diameter and so contains 0.30 g of tellurium or 0.43 g of cadmium per millimeter of length. At a typical growth rate of $5 \times 10^{-4}$ mm/s, the tellurium solidifies at 0.15 mg/s and the cadmium at 0.22 mg/s. Since the fusion enthalpies are respectively 0.137 and 0.054 j/g, the heat of freezing is 20$\mu$w for tellurium and 12$\mu$w for cadmium. This heat is negligible, and, further, in the present process, most of the vapor which condenses does not solidify but drops back into the evaporator as liquid.

The thermal resistance between the growing crystal face and the cold collet is composed of the process tube stem in series with the parallel combination of the crystal and the process tube wall. Using 0.03 w/cm deg for the phonon thermal conductivity of the silica process tube stem, the stem resistance is 530 deg/w, while that of the crystal and process tube varies from zero at the start of growth to about 150 deg/w when 10 cm of tellurium has been grown. The thermal resistance of an additional cadmium crystal is negligible. Since the temperature difference from tellurium freeze to cold collet is 645 degrees, and from cadmium growth is 516 degrees, the heat conduction to the cold collet varies from 1.2 w at the start of tellurium growth to 0.76 w during cadmium growth. This heat is much more than that supplied by the vapor condensation alone, and so there must be significant radiative transfer from the heater to the crystal. For this reason, crystal growth takes place about a centimeter down inside the heater.

The location of the crystal growth is self stabilized, in that the crystal will advance more rapidly than the furnace travel until it catches up with the right conditions for growth, or conversely, if the crystal is too long, it will melt back. If growth is begun before venting the trapped gas in the tube, and subsequent to venting the same power is applied at the same heater position, there is a drop of temperature in the evaporator of as much as 20° C., and at the same time, the growth face will retreat up the heater by up to 1 cm. This is due to the increased heat pipe effect of the improved vapor flow.

Segregation and Purification

The vaporization and solidification are equilibrium processes, while the condensation is not. Thus the segregation constant for condensation is close to unity, and the composition of the hanging drop will be that of the vapor. If the source composition is $C_s$, the vapor composition $C_v$, the drop composition $C_d$ and the crystal composition is $C_c$, then $$\left. \begin{array}{l} C_v = k_v C_s \\ C_d = C_v \\ C_c = k_f C_d \end{array} \right\} \quad C_c = k_v k_f C_s$$

define the various segregation constants, and it is clear that the appropriate segregation constant for the whole process is $k = k_v k_f$.

The hanging drop grows and falls back into the evaporator when it reaches a mass of about 200 mg, judged by the observed 4 mm diameter of the falling drop. This process is repeated at rates of from several times per minute to less than once a minute, depending on the amount of inert gas present. The departing drop agitates the remaining liquid and the impact at the evaporator surface makes substantial waves, and so there is complete mixing in each of the fluid phases. The resulting impurity distribution is given by Pfann's equation for normal freezing with ideal fluid mixing $$C = kC_o(1-g)^{k-1}$$

where $k = k_v k_f$ and g is the fraction of the original melt crystallized. If the heater is turned off before the evaporator is empty, this results in a considerable purification, depending on the values of $k_v$ and $k_f$ for the particular impurity. If commercial zone refined tellurium is evaporated completely, there is generally an inert sludge remaining, whose mass is from $10^{-3}$ to $10^{-4}$ times the original mass of tellurium, and whose composition is quite variable.

Finally, the crystal grown in this system is free of dissolved gas. This may be particularly important in the case of hydrogen in tellurium to be used in sealed silica ampoule growth of (Hg-Cd)Te, as in that case free hydrogen may reduce some of the silica, and the resulting water promote sticking of the crystal to the ampoule wall.

What is claimed is;

1. A vapor-liquid-solid (VLS) solids refining process which comprises:
   (a) establishing and maintaining in a closed VLS system having an evaporation zone and a condensing-solidifying zone an ambient gas pressure which is substantially below the vapor pressure at its melting point of a solid material located in the evaporation zone, said solid material being the material to be purified and having gases dissolved therein,
   (b) evaporating the material in the evaporation zone to provide vapors of the material, said material having a vapor pressure in the evaporation zone greater than the vapor pressure of said material at its melting point,
   (c) maintaining a temperature in the condensing-solidifying zone effective to condense the vapors of said material to a liquid and to solidify said material at a rate substantially less than the rate of condensation of said material, whereby the liquid material continuously washes the surface of the solid material in the condensing-solidifying zone, and
   (d) transporting the unsolidified portion of the liquid material from the condensing-solidifying zone to the evaporation zone.

2. A process according to claim 1 wherein the transporting of step (d) is effected by maintaining the evaporation zone and the condensing-solidifying zone in open vertical communication with the condensing-solidifying zone located above the evaporation zone.

3. A process according to claim 1 including the following additional step:
   (e) removing gases released from said solid material during step (b) which are uncondensable under the conditions of step (c).

4. A process according to claim 1 wherein the material to be purified comprises a member of Group VI A of the Periodic Table except oxygen.

5. A process according to claim 4 wherein the member of Group VI A is tellurium.

6. A process according to claim 1 wherein material to be purified comprises a member of Group II B of the Periodic Table.

7. A process according to claim 6 wherein the member of Group II B is cadmium.

8. A process according to claim 1 wherein the material to be purified comprises a compound which evaporates congruently.

9. A process according to claim 8 wherein the compound is CdS.

10. A process according to claim 1 wherein vapor pressure of the material in the evaporation zone is about 10 to about 300 times the vapor pressure at the melting point of the material.

11. A process according to claim 10 wherein the vapor pressure of the material in the evaporation zone is about 50 to about 100 times the vapor pressure at the melting point of the material.

12. A process according to claim 1 wherein the rate of solidification is about 0.5 to about 10% of the rate of condensation in step (c).

13. A process according to claim 12 wherein the rate of solidification is about 1 to about 5% of the rate of condensation in step (c).

* * * * *